United States Patent
Keeley et al.

(10) Patent No.: US 6,942,221 B2
(45) Date of Patent: Sep. 13, 2005

(54) SEAL HAVING GAPS

(75) Inventors: Philip D. Keeley, Darien, IL (US); John A. Serio, Lake In The Hills, IL (US)

(73) Assignee: International Engine Intellectual Property Company, LLC, Warrenville, IL (US)

(*) Notice: Subject to any disclaimer, the term of this patent is extended or adjusted under 35 U.S.C. 154(b) by 0 days.

(21) Appl. No.: 10/376,840

(22) Filed: Feb. 27, 2003

(65) Prior Publication Data

US 2004/0169340 A1 Sep. 2, 2004

(51) Int. Cl.$^7$ ................................. F16L 17/06
(52) U.S. Cl. ............... 277/608; 277/609; 277/616; 277/637; 277/641; 236/34; 236/34.5
(58) Field of Search ............... 277/608, 609, 277/616, 637, 630, 641, 642; 285/136.1, 141.1, 139.1, 139.2; 236/34, 34.5

(56) References Cited

U.S. PATENT DOCUMENTS

| | | | | |
|---|---|---|---|---|
| 3,224,014 A | * | 12/1965 | Pietrzak | 4/252.6 |
| 4,977,936 A | * | 12/1990 | Thompson et al. | 141/312 |
| 5,078,533 A | * | 1/1992 | Madonio et al. | 403/288 |
| 5,240,345 A | * | 8/1993 | Gagas | 404/25 |
| 6,578,769 B1 | * | 6/2003 | Mathew et al. | 236/34 |
| 6,688,608 B2 | * | 2/2004 | Doyle | 277/604 |

* cited by examiner

*Primary Examiner*—Enoch Peavey
*Assistant Examiner*—Sandra F. Garnett
(74) *Attorney, Agent, or Firm*—Susan L. Lukasik; Dennis Kelly Sullivan; Jeffrey P. Calfa

(57) ABSTRACT

A sealed flange includes a seal (203 or 901) and a flange (201 or 801). The outer perimeter of a flange (201 or 801) has tabs (303 or 803) interspaced with notches (601 or 805). The outer perimeter of a seal (203 or 901) has spacers (305 or 903) interspersed with gaps (501 or 909). When the seal (203 or 901) is disposed along the outer perimeter of the flange (201 or 801), the tabs (303 or 803) fit in the gaps (501 or 909) of the seal (203 or 901) while the spacers (305 or 903) fit in the notches (601 or 805) of the flange (201 or 801). The outer perimeter of the sealed flange comprises the outermost edges of the tabs (303 or 803) of the flange (201 or 801) and the outmost edges of the spacers (305 or 903) of the seal (203 or 901).

27 Claims, 3 Drawing Sheets

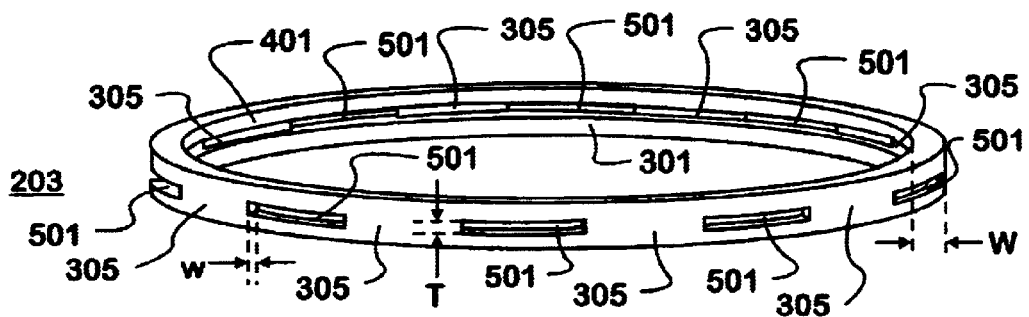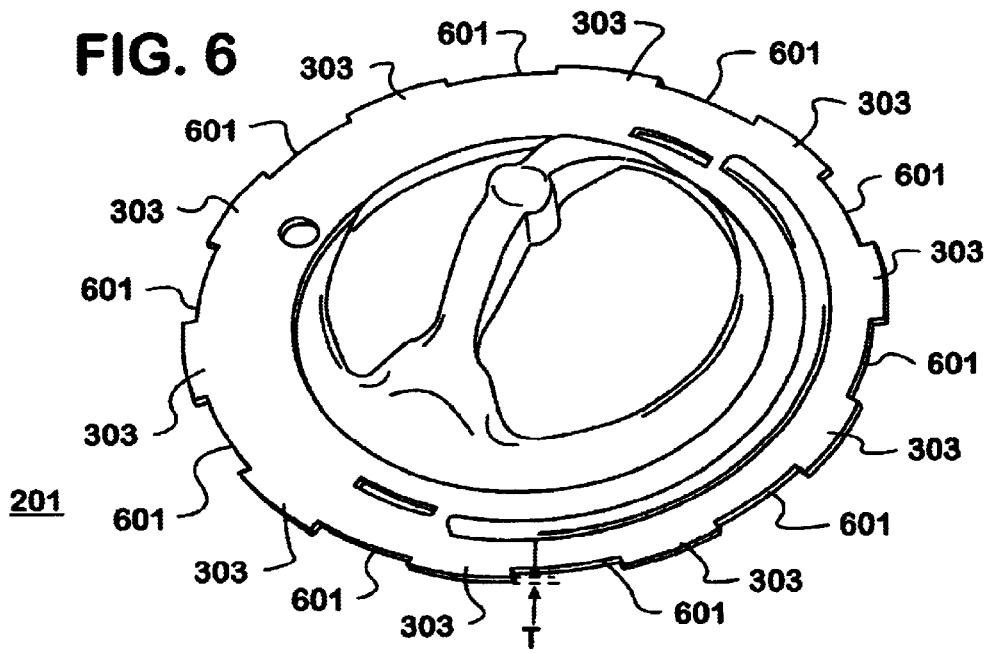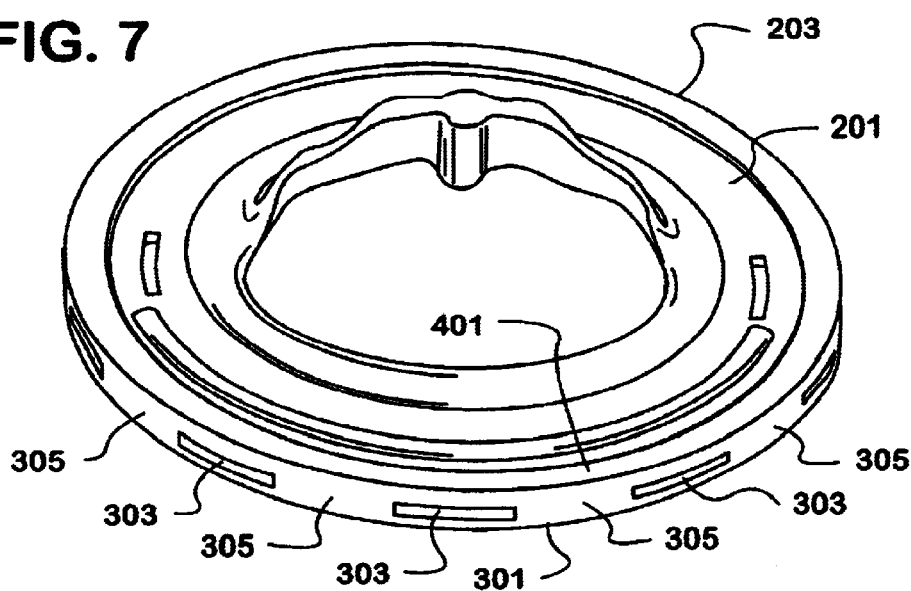

SEAL HAVING GAPS

FIELD OF THE INVENTION

This invention relates to seals, including but not limited to seals utilized in conjunction with flanges, for example, as may be utilized in internal combustion engines.

BACKGROUND OF THE INVENTION

Flanges are attached to various devices and are commonly utilized for many purposes, including to attach the device to another object; to guide, pilot, locate, and/or orient the device; and/or to provide support for the device. For example, FIG. 1 shows a part of a flange 101 that may be attached to, for example, a thermostat for use in a water pump. A seal 103 is disposed between the housing 105 of the water pump, the flange 101, a water outlet tube flange 107, and a support member 109. Because the thermostat is subject to pressure fluctuations within the housing 105, the thermostat, including its seal 103, may move around or vibrate within the housing 105, which can overstress the seal and cause leakage.

Accordingly, there is a need for a seal, for use with a flange, that withstands pressure fluctuations with reduced leaking compared to prior sealing arrangements.

SUMMARY OF THE INVENTION

A seal includes a first rim having an outer perimeter and a second rim having an outer perimeter. A plurality of spacers are disposed between the first rim and the second rim. The plurality of spacers are intermittently spaced with a plurality of gaps along the outer perimeter of the first rim and along the outer perimeter of the second rim.

BRIEF DESCRIPTION OF THE DRAWINGS

FIG. 5 is a perspective view of a seal having gaps in accordance with the invention.

FIG. 6 is a perspective view of a notched flange in accordance with the invention.

FIG. 7 is a perspective view of a seal disposed on a notched flange in accordance with the invention.

DESCRIPTION OF A PREFERRED EMBODIMENT

The following describes an apparatus for and method of providing a sealed flange. The outer perimeter of a flange has tabs interspaced with notches. The outer perimeter of a seal has spacers interspersed with gaps. The tabs fit in the gaps of the seal while the spacers fit in the notches of the flange. The outer perimeter of the sealed flange comprises the outermost edges of the tabs of the flange and the outmost edges of the spacers of the seal.

Figure 1:
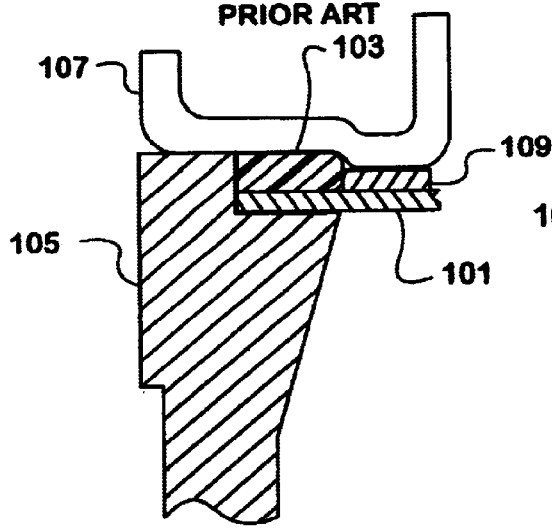
FIG. 1 is a cross-sectional diagram of a seal utilized with a flange for a thermostat in a water pump.
Figure 2:
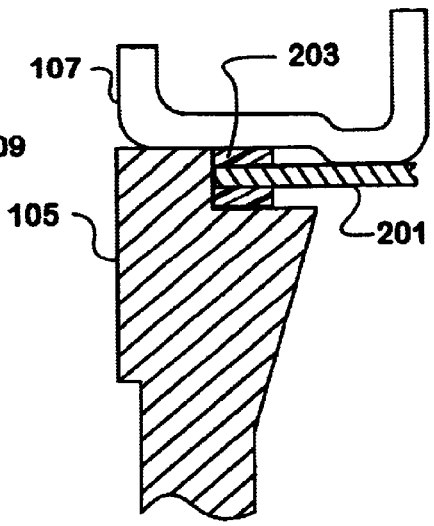
FIG. 2 is a cross-sectional diagram of a seal having gaps as utilized with a notched flange for a thermostat in a water pump in accordance with the invention.

A cross-sectional diagram of a seal having gaps as utilized with a notched flange for a thermostat in a water pump is shown in FIG. 2. A flange 201 is disposed between two rims of a seal 203 along the outer perimeter of the flange 201, yielding a sealed flange.

Figure 3:
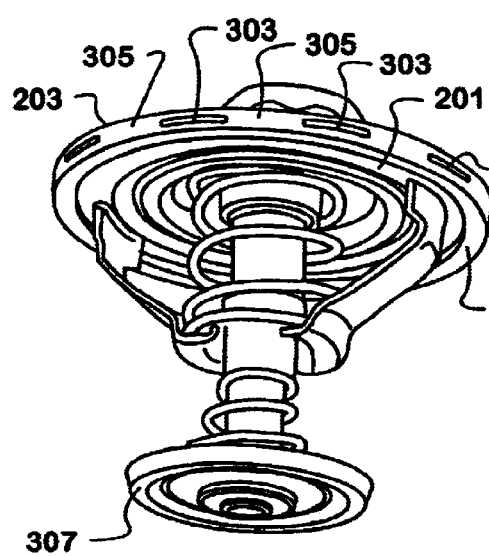
FIG. 3 and FIG. 4 are perspective views of a seal disposed on a notched flange in accordance with the invention.
Figure 4:
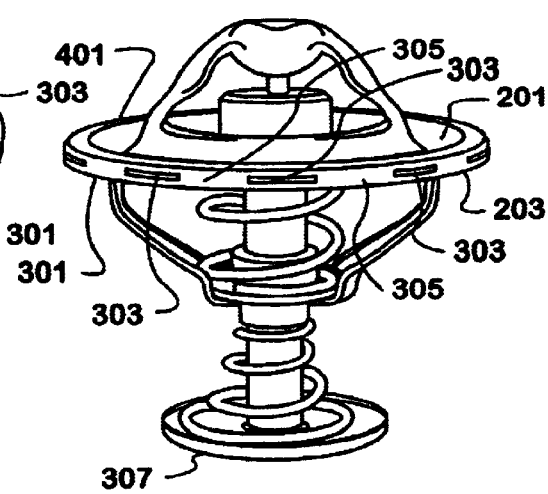

Perspective views of a seal disposed on a notched flange are shown in FIG. 3 and FIG. 4. The flange 201 of the thermostat 307 has an outer perimeter comprised of a plurality of tabs 303 interspaced with a plurality of notches (see FIG. 6). The seal 203 includes a plurality of spacers 305 disposed between a first rim 301 and a second rim 401. The spacers 305 are intermittently spaced with a plurality of gaps (501 of FIG. 5) along an outer perimeter of the first rim 301 and along an outer perimeter of the second rim 401. The spacers 305 are disposed in the notches when the seal is disposed along the outer perimeter of the flange, as shown in FIG. 3 and FIG. 4.

A perspective view of a seal having gaps is shown in FIG. 5. The seal 203 is shown with the first rim 301 and the second rim 401 on opposing sides of the seal 203. Although the rims 301 and 401 are shown as identical, they need not be identical for a successful implementation. For example, if the flange 201 and seal 203 are disposed in a conical housing, the rims 301 and 401 would be appropriately shaped, e.g., conical, to substantially match, as desired, the shape of the housing. In the conical example, the rims 301 and 401 and spacers would be conically shaped on the outer perimeter, and one of the rims would have a smaller diameter than the other.

The spacers 305 are disposed between the first rim 301 and the second rim 401. The spacers 305 are intermittently spaced with the gaps 501 along an outer perimeter of the first rim 301 and along an outer perimeter of the second rim 401. The spacers 305 may be evenly or unevenly spaced with the gaps 501. The spacers 305 may be the same size or different sizes. The spacers 305 may all be shaped similarly, or they may be differently shaped. The gaps 501 may also be shaped similarly, or they may be differently shaped. As shown in FIG. 5, the first rim 301 and the second rim have a width W that is wider that the width w of the spacers 305, i.e., the spacers 305 are not as wide as the rims 301 and 401. Alternatively, the first rim 301, the second rim, and the spacers may be of the same width.

In the example shown in the figures, the seal 203 is axially and radially symmetrical, the spacers 305 are evenly spaced with the gaps 501, and the spacers 305 are evenly sized. One advantage of having an axially and radially symmetrical seal 203 with evenly sized and spaced spacers 305 is that the flange 201 tends to be centered in position within its housing, even under extreme pressure fluctuations. As a result, any device attached to the flange 201, such as a thermostat 307, is firmly supported and located and/or oriented within the bore of the housing of the thermostat 307 as compared to other types of seals.

A perspective view of a notched flange is shown in FIG. 6. The flange 201 has an outer perimeter comprised of the tabs 303 interspaced with the notches 601. The thickness T of the tabs 303 is advantageously the same as the thickness of the gaps 501 or spacers 305 of the seal 203. The tabs 303 need not have the same thickness as the gaps 501 or spacers 305. Although the tabs 303 are shown as evenly spaced along the outer perimeter of the flange 201, the tabs may be unevenly spaced along the outer perimeter of the flange 201. The tabs 303 may all be shaped similarly, or they may be differently shaped. The notches 601 may also be shaped similarly, or they may be differently shaped. Advantageously, the shape of the outermost edge of the tabs 303 substantially matches at least part of a shape of an inner perimeter of a housing in which the flange is disposed. When these shapes are substantially the same, the flange 201 tends not to move or vibrate when installed in the housing, even under high pressure. Sandwiching the seal 203 around the flange 201 also assists with holding the flange 201, and anything connected thereto, in place.

A perspective view of a seal disposed on a notched flange is shown in FIG. 7. The plurality of tabs 303 are disposed in the plurality of gaps 501 when the seal is disposed along the outer perimeter of the flange 201. A part of the outer perimeter of the sealed flange is comprised of an outermost edge of each of the plurality of tabs 303. As shown in FIG. 7, the outermost edge of each of the tabs 303 and an outermost edge of each of the spacers 305 form an outer perimeter that is shaped substantially the same as the outer perimeter of the first rim 301 or the second rim 401. The tabs 303 and the spacers 305 are shown as co-planar, and the tabs 303 are disposed between the first rim 301 and the second rim 401. The tabs 303 are disposed along the outer perimeter of the first rim 301 and the outer perimeter of the second rim 401. The first rim 301 is disposed on a first surface of the flange 201 and the second rim 401 is disposed on a second surface of the flange 201 when the seal is disposed on the flange 201. The first surface and the second surface are shown as opposing surfaces in FIG. 7. When the seal 203 is disposed on the flange 201, an outermost edge of each of the tabs is uncovered adjacent to the outer perimeter of the rims 301 and 401.

The general shape of the sealed flange may vary while providing a successful sealed flange. The shapes and sizes of the notches, tabs, spacers, and gaps may also vary while providing a successful sealed flange. An embodiment having a generally rectangular shape is shown in FIG. 8 through FIG. 11, as compared to the generally circular embodiment shown in FIG. 3 through FIG. 7.

Figure 8:
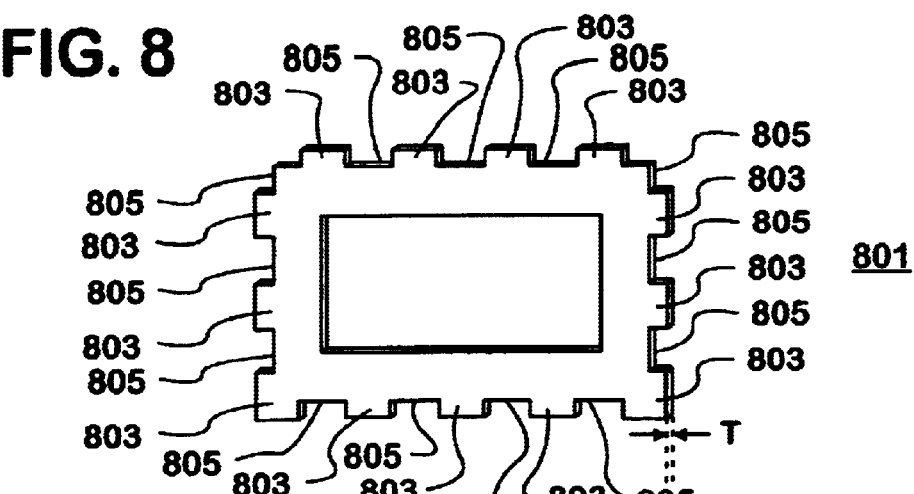
FIG. 8 is a perspective view of a notched rectangular flange in accordance with the invention.

A perspective view of a notched rectangular flange is shown in FIG. 8. The rectangular flange 801 has a plurality of rectangular tabs 803 interspersed with a plurality of rectangular notches 805.

Figure 9:
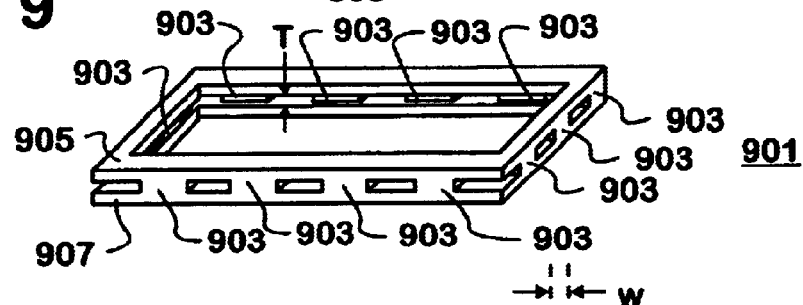
FIG. 9 is a perspective view of a rectangular seal having gaps in accordance with the invention.

A perspective view of a rectangular seal having gaps is shown in FIG. 9. The rectangular seal 901 has a plurality of rectangular spacers 903 alternating with a plurality of gaps in between a first rim 905 and a second rim 907. As with the generally circular embodiment, the seal 901 has generally the same shape, i.e., rectangular, as the general shape of the flange 801, i.e., rectangular, as if the notches 805 were not present in the flange 801.

Figure 10:
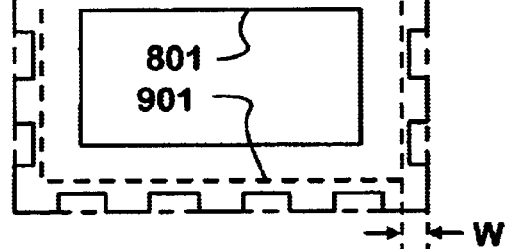
FIG. 10 is a perspective view of a rectangular seal disposed on a notched rectangular flange in accordance with the invention.

A perspective view of a rectangular seal disposed on a notched rectangular flange is shown in FIG. 10. As with the generally circular embodiment, the seal 901 is disposed along the outer perimeter of the flange 801 such that the outer perimeter of the first rim 905 and the outer perimeter of the second rim 907 are adjacent to an outermost edge of each of the spacers 903 and an outermost edge of the tabs 803. The outer perimeter of the sealed flange is comprised of an outermost edge of the tabs 803 interspersed between an outermost edge of the spacers 903 disposed between and adjacent to the outer perimeter of the first rim 905 and the outer perimeter of the second rim 907.

The thickness T of the tabs 803 of the flange 801 is advantageously the same as the thickness of the gaps or spacers 903 of the seal 901. As shown in FIG. 10, the rims 905 and 907 have a width W that is wider that the width w of the spacers 903, i.e., the spacers 903 are not as wide as the rims 905 and 907. Alternatively, the rims 905 and 907 and the spacers may be of the same width.

Figure 11:
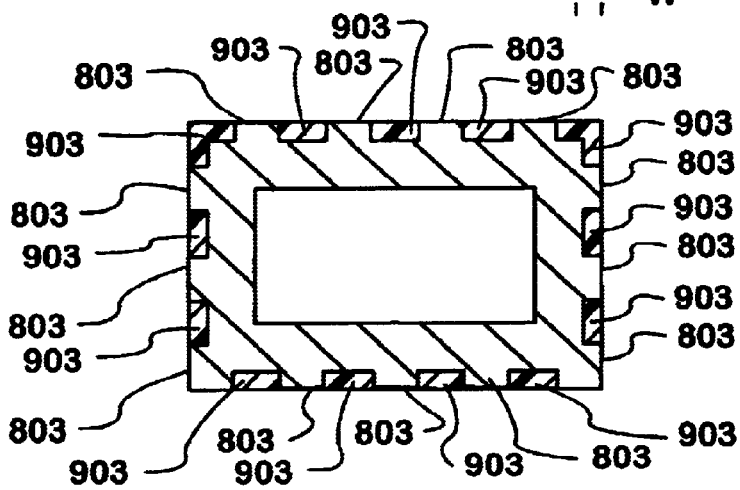
FIG. 11 is a cross-sectional view of a rectangular seal disposed on a notched rectangular flange in accordance with the invention.

A cross-sectional view of a rectangular seal disposed on a notched rectangular flange is shown in FIG. 11. Advantageously, as with the embodiment of FIG. 3 through FIG. 7, the outer perimeter of the first rim 905, the outer perimeter of the second rim 907, and an outermost edge of each of the spacers 903 do not extend further than the outermost edge of the tabs 803 in the embodiment of FIG. 8 through FIG. 11.

Advantageously, the spacers are shaped in substantially the same way as the notches are shaped. Alternatively, the spacers may be shaped differently than the notches, as long as at least a part of them fits inside the notches. Advantageously, the spacers are the same size as the notches. Alternatively, the spacers may be smaller than the notches, and/or the gaps may be larger than the tabs.

The seal may be molded as a separate piece, or formed of multiple pieces, to allow for reuse of the device attached to the flange (such as a thermostat) when the seal wears out and to allow for reuse of the seal when the device attached to the flange wears out. Alternatively, the seal may be molded onto the flange, although such an arrangement would not as easily allow for reuse of the device attached to the flange or the seal if either wears out.

The seal is disposed along the outer perimeter of the flange yielding a sealed flange. The shape of an outer perimeter of the sealed flange substantially matches at least part of a shape of an inner perimeter of a housing in which the sealed flange is disposable. The sealed flange may be arranged and constructed to be disposed in a housing containing a fluid for use in an internal combustion engine. The fluids may be water, coolant, oil, fuel, or any other fluid. The sealed flange may be utilized in environments other than an internal combustion engine.

The sealed flange of the present invention provides advantage over an arrangement that places a solid seal (having no gaps or spacers) around the outermost edge of the flange. The flange may cut the solid seal when the flange is put under pressure, resulting in a leaking seal. The sealed flange does not suffer from this problem, because the tabs of the flange extend through the gaps in the seal. The outer perimeter of the sealed flange substantially matches the housing in which the sealed flange is seated, resulting in a more reliable seal. The sealed flange locates, orients, and/or supports the seal, particularly in high pressure conditions, providing robustness and control.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An apparatus for use with a thermostat, the apparatus comprising:

a flange having an outer perimeter comprised of a plurality of tabs interspaced with a plurality of notches, wherein the outer perimeter of the flange is an outermost perimeter of the flange;

a seal comprised of a plurality of spacers disposed between a first rim and a second rim, wherein the plurality of spacers are intermittently spaced with plurality of gaps along an outer perimeter of the first rim and along an outer perimeter of the second rim;

wherein the plurality of spacers are disposed in the plurality of notches when the seal is disposed along the outer perimeter of the flange.

2. The apparatus of claim 1, wherein the plurality of spacers are shaped in substantially the same way as the plurality of notches are shaped.

3. The apparatus of claim 1, wherein the plurality of tabs are evenly spaced along the outer perimeter of the flange.

4. The apparatus of claim 1, wherein the seal is disposed long the outer perimeter of the flange yielding a sealed flange and a shape of an outer perimeter of the sealed flange substantially matches at least part of a shape of an inner perimeter of a housing in which the sealed flange is disposable.

5. The apparatus of claim 1, wherein the first rim and the second rim have a first width, wherein the spacers have a second width, and wherein the first width is greater than the second width.

6. The apparatus of claim 1, wherein the first rim is disposed on a first surface of the flange and the second rim is disposed on a second surface of the flange when the seal is disposed along the outer perimeter of the flange.

7. The apparatus of claim 1, wherein the seal is disposed long the outer perimeter of the flange and wherein an outermost edge of each of the plurality of tabs and an outermost edge of each of the plurality of spacers form an outer perimeter that is shaped substantially the same as the outer perimeter of the first rim.

8. The apparatus of claim 1, wherein the seal is disposed long the outer perimeter of the flange yielding a sealed flange, and wherein a part t the outer perimeter of the sealed flange is comprised of an outermost edge of each of the plurality of tabs.

9. The apparatus of claim 1, wherein the plurality of tabs nd the plurality of spacers have substantially the same thickness.

10. The apparatus of claim 1, wherein the seal is dispose along the outer perimeter of the flange such that the plurality of tabs and the plurality of spacers are co-planar, the plurality of tabs are disposed between the first rim a d the second rim, and the plurality of tabs are disposed along the outer perimeter of the first rim and the outer perimeter of the second rim.

11. The apparatus of claim 1, wherein the seal is disposed along the outer perimeter of the flange such that an outermost edge of each of the plurality of tabs is uncovered adjacent to the outer perimeter of the first rim.

12. The apparatus of claim 1, wherein the seal is disposed along the outer perimeter of the flange yielding a sealed flange, and wherein the outer perimeter of the sealed flange is comprised of an outermost edge of each of the plurality of tabs interspersed between an outermost edge of each of the plurality of spacers disposed between and adjacent to the outer perimeter of the first rim and the outer perimeter of the second rim.

13. The apparatus of claim 1, wherein the plurality of tabs re disposed in the plurality at gaps when the seal is disposed along the outer perimeter of the flange.

14. The apparatus of claim 1, wherein the outer perimeter of the first rim, the outer perimeter of the second rim, and an outermost edge of each of the plurality of spacers do not extend further than an outermost edge of each of the plurality of tabs.

15. The apparatus of claim 1, wherein the seal is disposed along the outer perimeter of the flange such that the outer perimeter of the first rim and the outer perimeter of the second rim are adjacent to an outermost edge of each of the plurality of spacers and an outermost edge of each of the plurality of tabs.

16. The apparatus of claim 1, arranged and constructed to be disposed in a housing containing a fluid for use in an internal combustion engine.

17. An apparatus for use with a the thermpstat, the apparatus comprising:

a seal comprising;

a first rim having an outer perimeter;

a second rim having an outer perimeter;

a plurality of spacers disposed between the first rim and the second rim, wherein the plurality of spacers are intermittently spaced with a plurality a gaps along the outer perimeter of the first rim and along the outer perimeter of the second rim, and wherein the first rim is separated from the second rim by the plurality of spacers;

a flange having an outer perimeter comprised of a plurality of tabs interspaced with a plurality of notches, wherein a shape of the outermost edge of the plurality of tabs substantially matches at least part of a shape of an inner perimeter of a housing in which the flange is disposable, and wherein the outermost edge of the plurality of tabs forms an outermost perimeter of the flange; wherein the outermost perimeter of the flange at least partially fits between the first rim and the second rim; and wherein the plurality of spaces at least partially fits in the plurality of notches.

18. The seal of claim 17, wherein the plurality of spacers are evenly spaced with the plurality of gaps.

19. The seal of claim 17, wherein the plurality of spacers are evenly sized.

20. The seal of claim 17, wherein the first rim and the second rim have a first width, wherein the spacers have a second width, and wherein the first width is greater than the second width.

21. The apparatus of claim 17, wherein the plurality of tabs are disposable in a plurality of gaps of a seal when the seal is disposed along the outer perimeter of the flange.

22. The apparatus of claim 17, wherein the plurality of tabs are evenly spaced along the outer perimeter of the flange.

23. The apparatus of claim 17, arranged and constructed to be disposed in a housing containing a fluid for use in an internal combustion engine.

24. The apparatus of claim 17, wherein the plurality of tabs extends radially outward.

25. The apparatus of claim 1, wherein the plurality of tabs extends radially outward.

26. The apparatus of claim 1, wherein the plurality of gaps extend completely through the seal.

27. The seal of claim 17, wherein the plurality of gaps extend completely through the seal.

* * * * *